United States Patent
Ransom et al.

(10) Patent No.: US 7,580,716 B2
(45) Date of Patent: Aug. 25, 2009

(54) METHOD AND APPARATUS FOR LOAD BALANCING IN A WIRELESS NETWORK

(75) Inventors: Antonio Juan Martinez Ransom, Bolingbrook, IL (US); John G. Hejny, Naperville, IL (US); David L. Oehring, Chicago, IL (US); Prashant K. Padhy, Aurora, IL (US); Gary Joseph Zabinski, Downers Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 443 days.

(21) Appl. No.: 11/095,379

(22) Filed: Mar. 31, 2005

(65) Prior Publication Data

US 2006/0221821 A1 Oct. 5, 2006

(51) Int. Cl.
*H04Q 7/20* (2006.01)
*H04L 12/28* (2006.01)
*H04L 12/56* (2006.01)

(52) U.S. Cl. .......... 455/453; 455/452.2; 455/403; 455/422.1; 455/436; 370/395.41; 370/395.21; 370/468

(58) Field of Classification Search .......... 455/453, 455/436, 442, 443, 448, 45.2, 452.2, 403, 455/422.1
See application file for complete search history.

(56) References Cited

U.S. PATENT DOCUMENTS

| | | | | |
|---|---|---|---|---|
| 6,069,871 A * | 5/2000 | Sharma et al. | ............... | 370/209 |
| 6,366,780 B1 * | 4/2002 | Obhan | ........................ | 455/453 |
| 6,876,857 B1 * | 4/2005 | Nee et al. | .................... | 455/450 |
| 6,996,374 B1 * | 2/2006 | Bao et al. | ................. | 455/67.11 |
| 7,298,834 B1 * | 11/2007 | Homeier et al. | ........ | 379/202.01 |
| 7,305,241 B2 * | 12/2007 | Hirvonen et al. | ............ | 455/453 |
| 2001/0047409 A1 * | 11/2001 | Datta et al. | ................. | 709/224 |
| 2006/0031563 A1 * | 2/2006 | Sebire et al. | ................ | 709/232 |

* cited by examiner

*Primary Examiner*—Huy Q Phan

(57) ABSTRACT

A method and apparatus for load balancing in a wireless network is provided. For example, this invention is directed to a technique for balancing bearer load across a bank of traffic processors associated with a high-availability radio network controller (RNC). Instantaneous measures (e.g. processor occupancy) are used as one parameter for such load balancing. Predictive measures are used as another parameter. The predictive measures indicate the degree to which a given processor can become busy in the next few intervals of time and is based on the unrealized potential as derived from the established data rate of bearer sessions. The overall technique described herein allows for an even distribution of highly bursty traffic, with an objective of preserving call quality during periods of increased network congestion.

14 Claims, 4 Drawing Sheets

METHOD AND APPARATUS FOR LOAD BALANCING IN A WIRELESS NETWORK

BACKGROUND OF THE INVENTION

This invention relates to a method and apparatus for load balancing in a wireless network. For example, this invention is directed to a technique for balancing bearer load across a bank of traffic processors associated with a high-availability radio network controller (RNC). Instantaneous measures (e.g. processor occupancy) are used as one parameter for such load balancing. Predictive measures are used as another parameter. The predictive measures indicate the degree to which a given processor can become busy in the next few intervals of time and is based on the unrealized potential as derived from the established data rate of bearer sessions. The overall technique described herein allows for an even distribution of highly bursty traffic, with an objective of preserving call quality during periods of increased network congestion.

While the invention is particularly directed to the art of load balancing in wireless networks, and will be thus described with specific reference thereto, it will be appreciated that the invention may have usefulness in other fields and applications. For example, the invention may be used in other applications where analysis of predictive measures of traffic patterns would be advantageous.

By way of background, with reference to FIG. 1, a typical cellular wireless communication system 10 is comprised of a plurality of cells 12, each occupying a separate geographical area in which mobile devices 15 may be roaming. Each cell usually includes a cell site 14 having known hardware necessary for providing wireless communication coverage to a plurality of wireless terminals, such as the mobile devices, or wireless terminals 15 within the cell. Examples of such hardware can include, but is not limited to radio frequency transmitters and receivers, antenna systems, interface equipment and power sources.

Each cell site 14 typically communicates with one or more active processes having application processors, such as those shown at 16, which handle access to system resources such as radios, channels and the like for the cell. Software applications running on these application processors 16 perform the control and traffic processing necessary to establish, maintain and transition wireless voice and data calls. Several cell sites typically communicate with a Radio Network Controller (RNC) 18, which switches wireless calls to a wireless Core Network 20, which in turn switches calls to, as an example, wired central offices to enable mobile terminals to communicate with phones over the Public Switched Telephone Network (PSTN) (not shown).

Radio access network traffic can be either in the form of control messages or traffic packets. Control messages are used to establish calls, manage the radio links associated with call, page user equipment, update the location of user equipment, etc. Traffic packets contain end-user data such as voice, browsed web pages, file transfers, etc.

It is common that processing of control messages is performed on one type of processor, called a control processor (CP), and the processing of traffic packets is performed on a different type of processor, called a traffic processor (TP). Typically, there are far more traffic packets than control messages for most user scenarios. So, there are typically many traffic processors (TPs) for every control processor (CP). As such, there is a hierarchical arrangement of control processors (CPs) to traffic processors (TPs) wherein the control processors (CPs) have the responsibility of distributing new user sessions to subtending traffic processors (TPs) (calls and user sessions are used interchangeably). It is important for a control processor (CP) to distribute the load on its subtending traffic processors (TPs) in a manner that prevents occurrences where some traffic processors (TPs) are in overload, from an occupancy/resource perspective, while other traffic processors (TPs) are relatively idle. In Second-Generation (2G) wireless systems, it has usually been sufficient to distribute user sessions based on instantaneous measures, such as the number of current user sessions in progress or processor occupancy.

Third Generation (3G) wireless systems are characterized by very high data rates (e.g. 2 megabytes per second and higher) and a level of traffic variability that far exceeds that experienced in the traditional voice only and Second Generation (2G) cellular data systems. This leads to rapid ramp-ups and ramp-downs in the traffic demands of a given user and, thus, for the radio access network as a whole.

The actual data rate for a given user session is partially confined to the data rate negotiated with the Radio Network Controller (RNC). Typical data rates could be 32K, 64K, 128K, 384K, 2 MB, etc. Separate data rates are established for uplink (mobile to network) and downlink (network to mobile) directions. It is also typical that the downlink data rate is significantly higher than the uplink data rate. A data rate is negotiated at the time that the session is established; however, that data rate may be dynamically reduced over time by the radio network controller (RNC). Reasons for doing this could be that the user session did not have sufficiently high utilization for a prolonged period of time, or as a means to reduce air interface congestion.

Typically, the load balancing methods, including those described in accordance with the invention below, here are applicable to all forms of traffic data and do not need to distinguish between circuit voice traffic, conversational packet traffic, streaming video, background data, etc.

Such load balancing methods serve to preserve the integrity of user sessions by pushing off traffic processor (TP) overload control until absolutely necessary. Once a traffic processor (TP) is allowed to go into overload, in a well thought out implementation, the focus shifts from preserving the integrity of user sessions to preserving the integrity of the processor and thus the system.

In this regard, once a TP goes into overload, provided that the overload control mechanisms are ideal, the user sessions will experience increased latency and reduced throughput due to retransmissions. Where the overload controls are inadequate, the processor is likely to reset and all user sessions terminated. This results in a negative reputation for the service provider in the eyes of the end-user, and a negative reputation for the infrastructure manufacturer in the eyes of the service provider. Ultimately, this can lead to the end-user changing service providers and the service provider changing infrastructure manufacturer.

The present invention contemplates a new and improved method and system for load balancing in a wireless network that resolves the above-referenced difficulties and others.

SUMMARY OF THE INVENTION

A method and apparatus for load balancing in a wireless network are provided.

In one aspect of the invention, a method comprises measuring occupancy of each of the plurality of traffic processors, estimating potential occupancy of the each of the plurality of traffic processors, determining a load level for the each of the plurality of traffic processors based on the measured occupancy and the potential occupancy, maintaining the load levels for the plurality of traffic processors, and, assigning the call load to the plurality of traffic processors based on the maintained load levels.

In another aspect of the invention, the measuring comprises measuring a current actual occupancy of the each of the plurality of traffic processors.

In another aspect of the invention, the estimating is based on negotiated bandwidths determined for calls comprising the call load.

In another aspect of the invention, the determining comprises applying a weighting factor.

In another aspect of the invention, the applying of the weighting factor comprises multiplying a difference between the measured occupancy and the potential occupancy of a traffic processor by a value.

In another aspect of the invention, the maintaining comprises storing load levels in a table.

In another aspect of the invention, a system comprises means for measuring occupancy of each of the plurality of traffic processors, means for estimating potential occupancy of the each of the plurality of traffic processors, means for determining a load level for the each of the plurality of traffic processors based on the measured occupancy and the potential occupancy, means for maintaining the load levels for the plurality of traffic processors, and, means for assigning the call load to the plurality of traffic processors based on the maintained load levels.

In another aspect of the invention, the means for measuring a current actual occupancy of the each of the plurality of traffic processors.

In another aspect of the invention, the means for estimating potential occupancy uses negotiated bandwidths determined for calls comprising the call load.

In another aspect of the invention, the means for determining a load level comprises means for applying a weighting factor.

In another aspect of the invention, the means for applying the weighting factor comprises means for multiplying a difference between the measured occupancy and the potential occupancy of a traffic processor by a value.

In another aspect of the invention, the means for maintaining load levels comprises a table.

In another aspect of the invention, a system comprises a load monitor operative to measure occupancy of each of the plurality of traffic processors, estimate potential occupancy of the each of the plurality of traffic processors and determine a load level for the each of the plurality of traffic processors based on the measured occupancy and the potential occupancy, and, a load balance manager operative to maintain the load levels for the plurality of traffic processors and assign the call load to the plurality of traffic processors based on the maintained load levels.

In another aspect of the invention, the load monitor resides on each of the plurality of traffic processors.

In another aspect of the invention, the load balance manager resides on a control processor.

In another aspect of the invention, the load monitor is operative to measure a current actual occupancy of the each of the plurality of traffic processors.

In another aspect of the invention, the load monitor is operative to estimate based on negotiated bandwidths determined for calls comprising the call load.

In another aspect of the invention, the load monitor is operative to apply a weighting factor.

In another aspect of the invention, the load monitor is operative to apply the weighting factor by multiplying a difference between the measured occupancy and the potential occupancy of a traffic processor by a value.

In another aspect of the invention, the load balance manager is operative to store load levels in a table.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

To preserve call quality, as noted above, it is advantageous to balance the traffic across the available traffic processors. The highly bursty nature of Third Generation (3G) wireless systems renders instantaneous measures, such as number of active sessions and processor occupancy, inadequate to effectively respond to the rapid ramp-ups and ramp-downs inherent in such systems. The embodiments described herein relate to methods and apparatus for effectively load balancing bursty high-speed wireless data.

Figure 1:
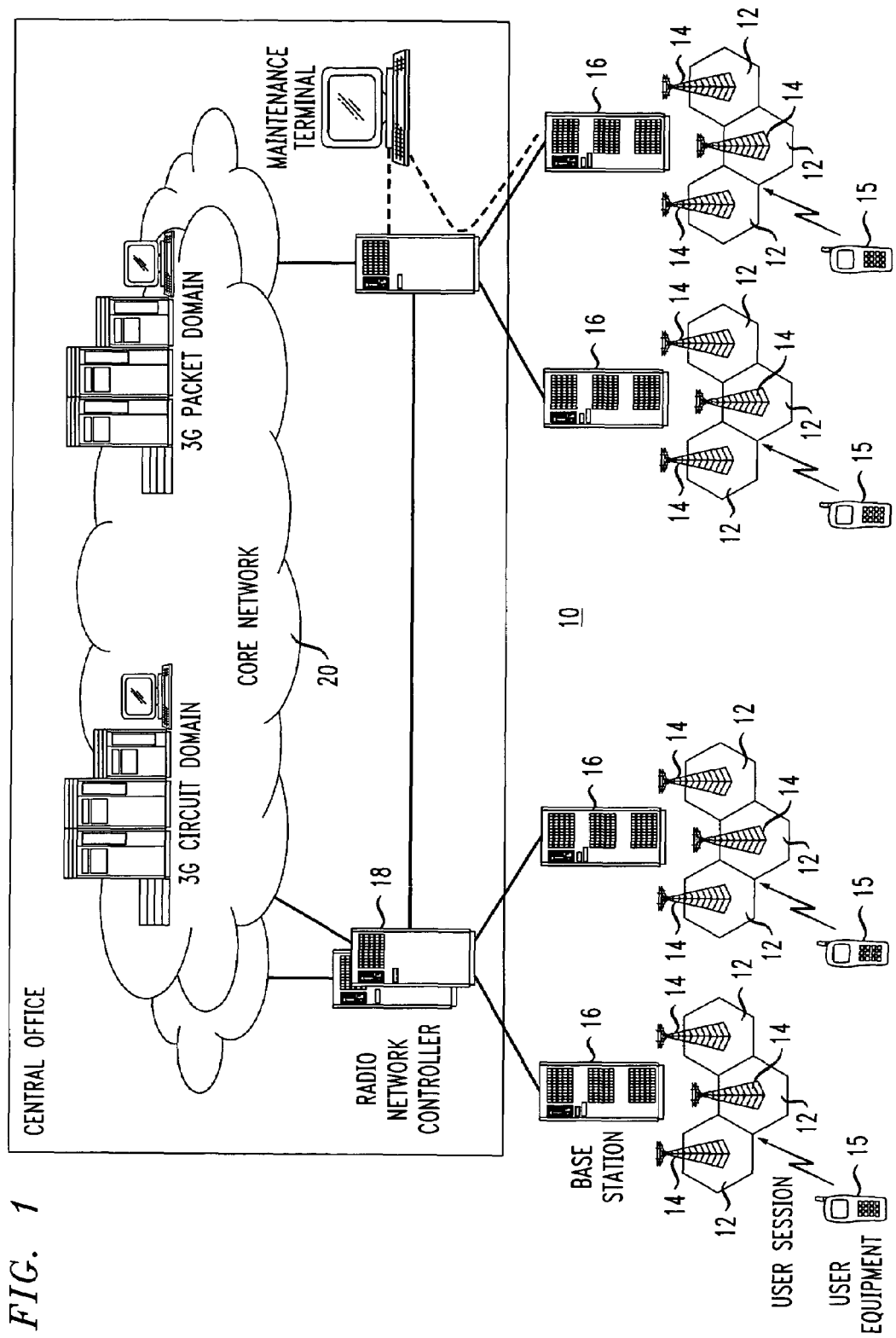
FIG. 1 is an exemplary network into which the present invention may be implemented.
Figure 2:
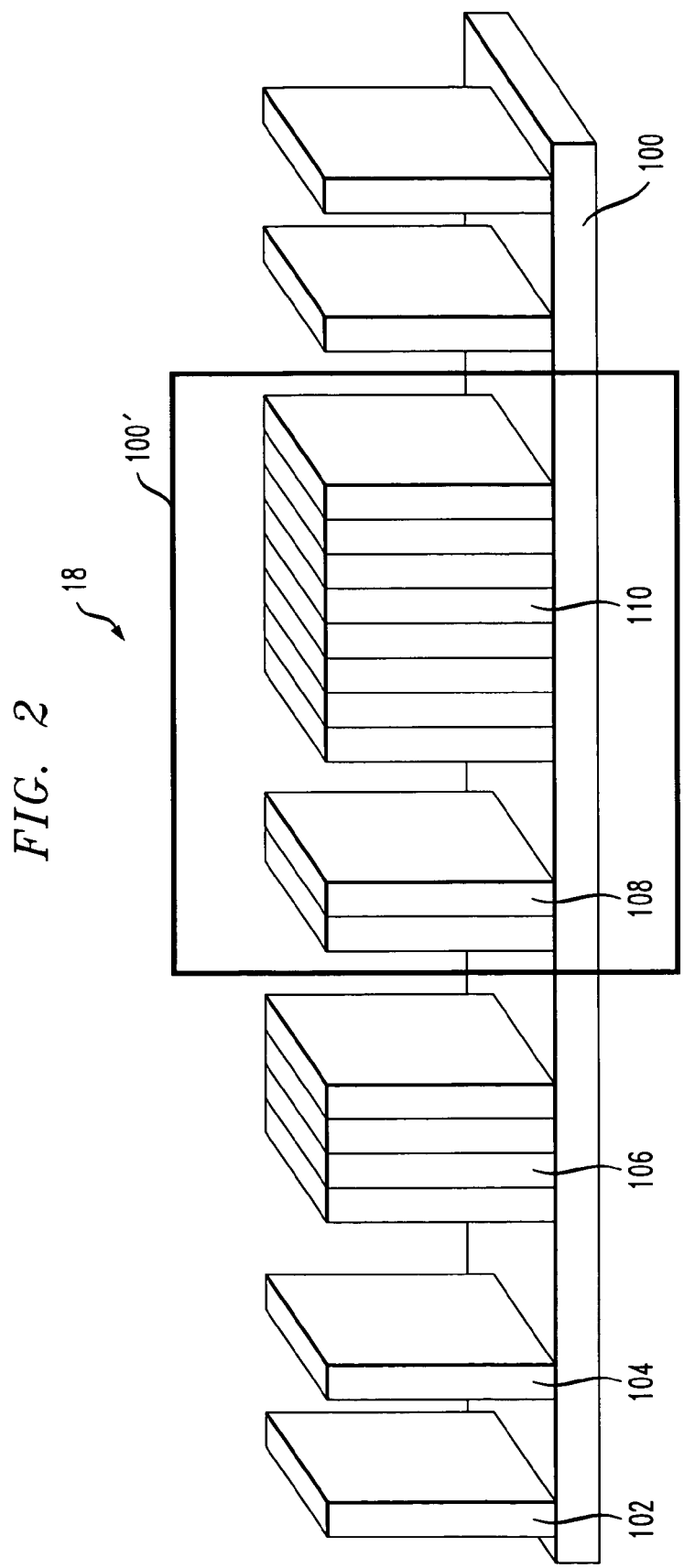
FIG. 2 is an exemplary view of a radio network controller (RNC) into which the present invention may be implemented.

Referring now to the drawings wherein the showings are for purposes of illustrating the preferred embodiments of the invention only and not for purposes of limiting same, FIG. 2 provides a view of an environment into which embodiments of the present invention may be incorporated. As shown, a radio network controller (RNC) 18 may include a variety of processors arranged in a variety of configurations for handling a call load. For example, the radio network controller (RNC) 18 may include on a shelf 100 therein a power supply 102, external and internal connectivity module 104, a processor bank 106 for Layer 3 signaling, call admission, handoff, etc. These components and their functionality are known to those skilled in the field and will not be described further herein.

In accord with the embodiments described herein, however, on a portion 100' of the shelf 100 of the radio network controller (RNC) 18, a plurality of control processors 108 and traffic processors 110 are provided. It will be understood by those of skill in the art that a single control processor 108 typically corresponds to a plurality of traffic processors 110 in a hierarchical manner. Of course, the precise ratio of control processors to traffic processors could be one-to-one. In any case, the design of the network and the traffic flow therethrough will be factors in determining the respective numbers of control processors and traffic processors.

It will be understood that the present invention, in one example, is implemented within software that is deployed within the radio network controller (RNC) 18. In one embodiment, this software is distributed among the control processors 108 and the traffic processors 110 to function as will be described herein. However, it is to be appreciated that the development described herein may be implemented using a variety of hardware configurations and/or software techniques. For example, the software may reside in locations other than or in addition to the control processors 108 and traffic processors 110 (i.e., within the core network).

Figure 3:
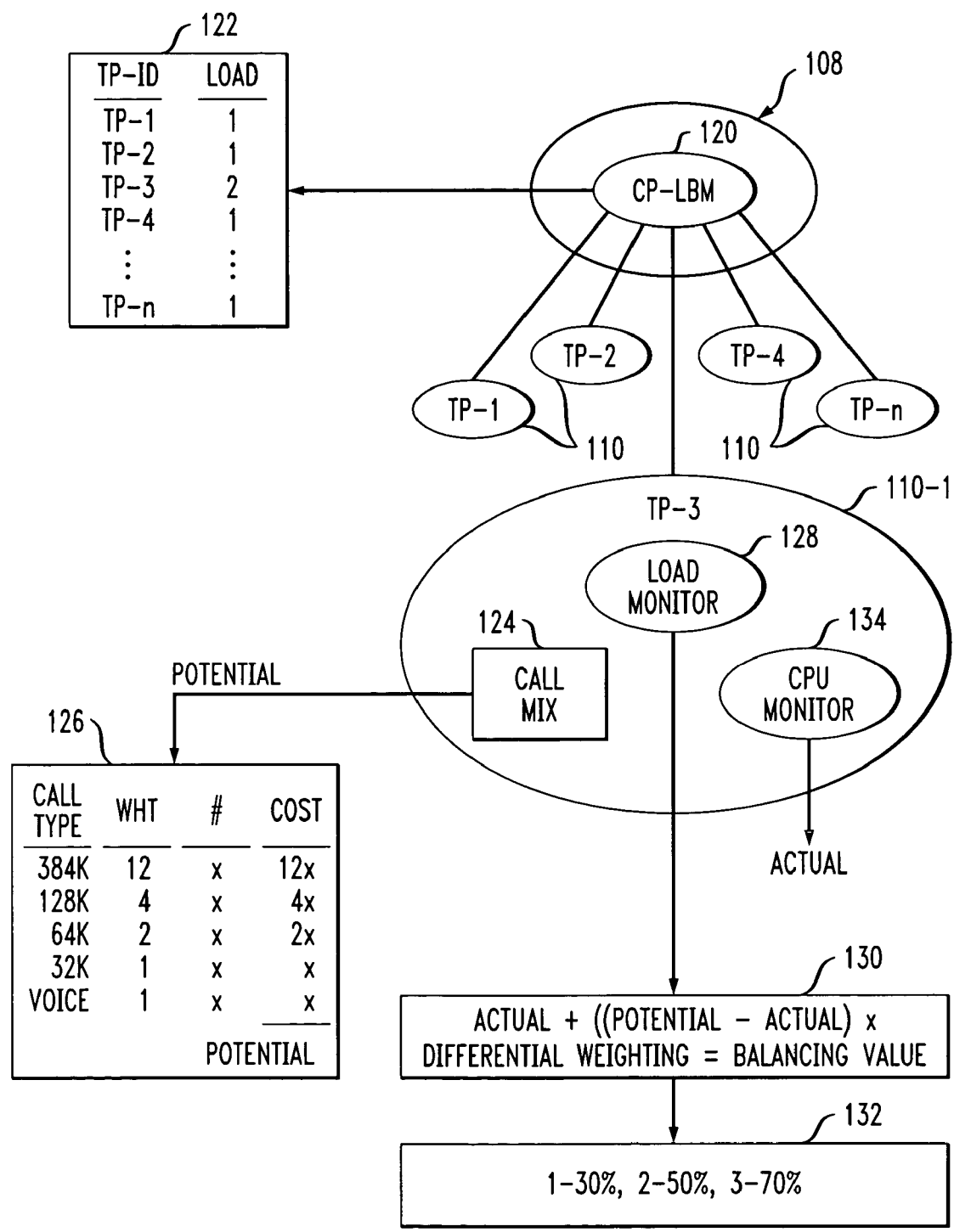
FIG. 3 is a representative view of an embodiment of the present invention.

With reference now to FIG. 3, a representative view of a control processor 108 and a plurality of traffic processors 110 that correspond to the control processor is shown. As shown, the control processor 108 includes a control processor load balance manager 120 that communicates with each of a plurality of traffic processors 110. The control processor load balance manager 120 maintains information regarding the load level of each of the traffic processors in the form of, for example, a table 122.

All of the plurality of the traffic processors 110 include a configuration such as that shown in connection with traffic processor 110-1. In this regard, a call mix module 124 is provided. The call mix module 124 has access to information with respect to the maximum potential load level, or potential occupancy, for each call that is assigned thereto. For example, this information may be retained in the form of a table such as that shown at 126. The table 126 is generated by the system by using the negotiated bandwidths that are assigned to various call types. The concept of negotiated bandwidths is known. As is shown in table 126, however, the data may represent these negotiated bandwidths in terms of processor units (e.g., "x"), as opposed to a bandwidth. So, as shown, a 384K call potentially consumes 12 processor units. Of course, data in the table may vary as will be dictated by the network designers and other factors.

The traffic processor 110-1 also includes a load monitor 128 that has the capability of and access to modules that can calculate balancing values such as that shown at 130. The calculated balancing value corresponds to and is translated to a load level such as the load levels illustrated in table 132.

The traffic processor 110-1 also includes a CPU monitor 134 that operates to measure the actual occupancy of the traffic processor. To do so, the CPU monitor 134 may simply count the number of active call sessions. Used bandwidths may also be measured. These techniques are well known in the art. This is considered an actual current occupancy. The actual occupancy and potential occupancy as determined by the traffic processor 110-1, are both used to calculate the balancing value (which may represent a percentage (%) of processor occupancy, as in table 132) as illustrated at block 130.

In operation, when a new call attempt or request for additional radio link resources is placed in a Third Generation (3G) network, signaling (e.g., layer 3 signaling) in the radio network controller (RNC) 10 makes a decision to admit or deny access to the request. As part of the call admission process, control processors 108 and traffic processors 110 are queried to establish a control context and to select a traffic processor to handle the call. For the reasons previously mentioned, it is advantageous to evenly distribute the processing across the available traffic processors 110. Distributing new user sessions across the traffic processors 110 based on equally balancing the number of user sessions across all traffic processors 110 is not desired since, as noted above, a session could be a 13 kilobyte per second voice call or a multi-megabyte high speed data user sessions, which places vastly different demands on the system.

Processor occupancy on the traffic processors 110 provides a measure of the spare capacity to support new user sessions. Load balancing solely on a measure of processor occupancy is not desired in that it does not account for "unrealized potential" of an underutilized radio link. For example, a 64K data link established for web browsing may experience some idle periods while the user reads downloaded web pages, then experiences a burst when the user clicks to browse the next page.

The load balancing techniques described in connection with embodiments of the present invention take into account both the "actual" and the "potential" load on a given traffic processor 110. The actual load is a measure of the current CPU occupancy. The "potential" load represents the estimated CPU occupancy if all bearers were to simultaneously reach their maximum established data rates. If the difference between potential minus the actual is non-zero, a weighting is applied to the difference. This value is henceforth referred to as the differential weighting. Thus, the parameters are:

Actual—measured CPU occupancy

Potential—an estimated value based on the served call mix

Differential weighting—is a tunable parameter, whereby if the value is set to 0, the algorithm amounts to being strictly processor occupancy based, and if the value is set to 1, then it represents the most conservative approach, reserving for the maximum future bursts that could occur. Of course, the value that is selected will depend upon a variety of factors, including the network configuration, traffic patterns, objections of the network providers, . . . etc.

The formula, as represented in the block 130 of FIG. 3, for calculating the load balancing value is then given by:

$$\text{Actual} + (((\text{potential}-\text{actual}):0)* \text{ Differential Weighting})=\text{Balancing value}$$

To illustrate an embodiment of the invention, an example is detailed below. In this regard, the potential is an aggregated estimate of the data rate/processor occupancy characterization. The estimation of the processor occupancy for a given call type is determined apriori. Assume that a voice call consumes 1 unit of CP. Here, a unit of CPU is measure that can be used to scale to any hardware, software, or platform implementation. All supported data rates can then be described in terms of this unit of CPU. For a given system implementation, real or theoretical calculations might conclude the following:

| | |
|---|---|
| Voice call | consumes up to 1 unit of CPU |
| 64 K | consumes up to 3 units of CPU |
| 128 K | consumes up to 6 units of CPU |
| 384 K | consumes up to 18 units of CPU |

A traffic processor supporting a call mix of 10 voice calls, eight 64K packet calls and two 384K calls has a potential to consume of (10*1)+(8*3)+2*18)=70 units. The following example shows how varying the differential-weighting varies the balance value.

$$\text{Actual} + (((\text{potential-actual}):0)* \text{ Differental Weighting})=\text{Balancing value}$$

$$50+((70-50)*0.0)=50$$

$$50+((70-50)*0.4)=58$$

$$50+((70-50)*1.0)=70$$

At each traffic processor (TP), a load monitor operative (TP-LM) would map all of this into a load level:

If the balancing value <40 then this TP is at LoadLevel-1
If the balancing value is >40 then the TP is at LoadLevel-2
If the actual (measured occupancy) >70 then the TP is at Load Level-3

The differential-weighting provides a way to tune how responsive the system is to very rapid ramp-ups in traffic bursts.

Based on one embodiment of a system implementation, various load levels are specified (apriori) that dictate how load balancing occurs. The load levels can be thought of as buckets to group the balancing values reported by the traffic processors 110. As an example, all traffic processors 110 reporting a Balancing Value of <=40 are treated the same. All traffic processors 110 reporting a Balancing Value >40 and <=60 are treated the same and so on. If one or more traffic processors 110 last reported that they are the lowest Load Level, then the next user session can be assigned to any traffic processor 110 in that lowest bucket. If no traffic processors 110 are reporting that they are in the lowest bucket then the next user session is assigned to a traffic processor 110 reporting a values that places them in the next to the lowest bucket, and so on. Of course, other techniques may also be used.

The traffic processors 110 have a load monitor (TP-LM) 128 that takes the processor occupancy measurement and then performs the calculation to determine the balancing value based on the pre-determined parameters for the given system implementation.

The control processors 108 have a load balance manager (CP-LBM) 120 that processes the load calculations from the traffic processor load monitors (TP-LMs) 128 to determine where to assign the next user session.

The control processor load balance manager (CP-LBM) is notified when the various LoadLevels are crossed (on the downside, the value would be slightly lower to prevent ping-ponging back and forth; e.g. once a TP-LM has reported LoadLevel-2, it would not report LoadLevel-1 until the balancing_value has dropped below say, 30%).

After initialization, the control processor load balance manager (CP-LBM) 120 assumes that all traffic processors 110 are at LoadLevel-1. New User sessions are assigned in either round-robin fashion or based on fewest number of User sessions amongst all the TPs that are at LoadLevel-1.

Should any traffic processors 110 report that they are at LoadLevel-2, control processor load balance manager (CP-LBM) 120 will continue to assign new User sessions to only those traffic processors 110 that are at LoadLevel-1.

Should the system reach the point where there are no more traffic processors 110 at LoadLevel-1, the control processor load balance manager (CP-LBM) 120 will then balance all new User sessions to those traffic processors 110 that are at LoadLevel-2.

When a traffic processor reports that it is at LoadLevel-3, the control processor load balance manager (CP-LBM) will no longer assign new User sessions to that traffic processor (LoadLevel-3) is only reported when the actual processor occupancy exceeds the overload threshold; thus, we only use potential to balance the load, not throttle traffic).

What this technique in accord with the present invention accomplishes is to balance load across the available traffic processors 110 in a manner that takes into account not only the number User sessions, or any instantaneous processor occupancy measurement, but also some measure of the potential burst that could occur.

Figure 4:
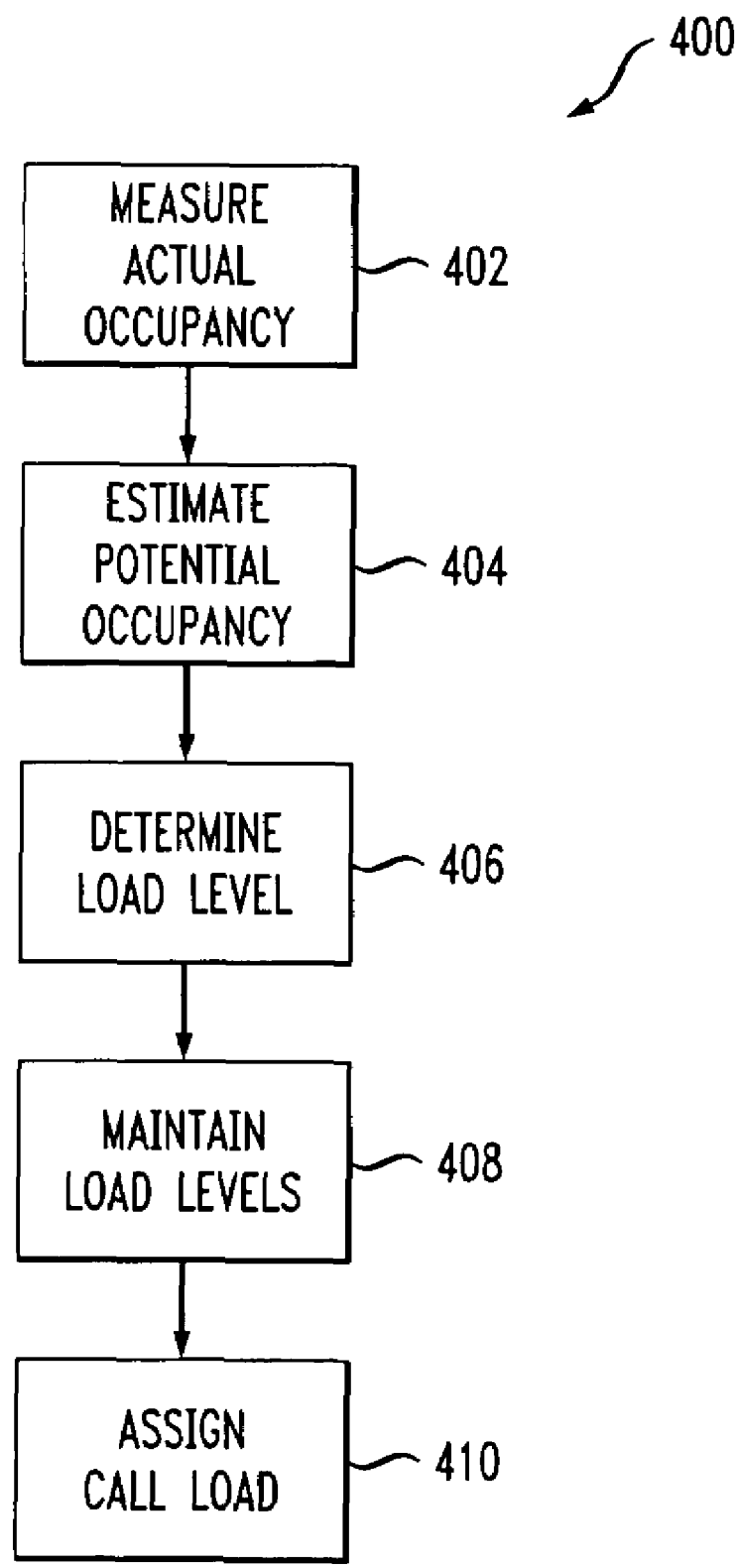
FIG. 4 is a flow chart illustrating a method according to the present invention.

With reference now to FIG. 4, a flow chart illustrating a method according to the present invention is illustrated. This method 400 includes measuring occupancy of each of the plurality of traffic processors (at 402). It should be understood-that the measuring comprises measuring a current actual occupancy of each of the plurality of traffic processors. This function is known in the art and may include a simple calculation of free CPU cycles over a measurement interval. The potential occupancy of each of the plurality of traffic processors is estimated (at 404). It should be understood that estimating is based on determining negotiated bandwidths for calls comprising the call load. The concept of negotiated bandwidth is known. Here, the values corresponding to negotiated bandwidth are used advantageously to balance load, as should be apparent from the above-referenced techniques for calculating a balancing value. Along these lines, a load level for each of the plurality of traffic processors is determined based on the measured or actual occupancy and the potential occupancy (at 406). It should be understood that determining, in at least one form, also comprises applying a weighting factor. In one form, the application of the weighting factor comprises multiplying a difference between the measured occupancy and the potential occupancy of a traffic processor by a value. A balancing value is then calculated as above and translated to a load level. These load levels are then maintained within the system (at 408). It should also be understood that the maintaining of the load levels comprises storing the load levels in a table. The maintained load levels are then accessed during the process of assigning the call load to the plurality of traffic processors (at 410).

As should be apparent from the above description, the load monitor 128 of each of the traffic processors 110 is operative to measure occupancy of each of the traffic processors 110, estimate potential occupancy of each of the traffic processors 110 and determine the load level for each of the traffic processors based on the measured occupancy and the potential occupancy. Likewise, the load balance manager 120 of the control processor 108 is operative to maintain the load levels and assign the call load to the plurality of traffic processors 110 based on the maintained load levels. It should be understood that this distribution of functionality is an example only. A variety of distributions of this functionality may suffice arid fall within the scope of the described embodiments.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for balancing call load across a plurality of traffic processors in a wireless network, the method comprising:

measuring occupancy of each of the plurality of traffic processors;

estimating potential occupancy of the each of the plurality of traffic processors;

determining a load level for the each of the plurality of traffic processors based on a difference between the measured occupancy and the potential occupancy, wherein the determining comprises applying a weighting factor, the applying of the weighting factor comprising multiplying the difference between the measured occupancy and the potential occupancy of a traffic processor by a value;

maintaining the load levels for the plurality of traffic processors; and, assigning the call load to the plurality of traffic processors based on the maintained load levels.

2. The method as set forth in claim 1 wherein the measuring comprises measuring a current actual occupancy of the each of the plurality of traffic processors.

3. The method as set forth in claim 1 wherein the estimating is based on negotiated bandwidths determined for calls comprising the call load.

4. The method as set forth in claim 1 wherein the maintaining comprises storing load levels in a table.

5. A system for balancing call load across a plurality of traffic processors in a wireless network, the system comprising:

means for measuring occupancy of each of the plurality of traffic processors;

means for estimating potential occupancy of the each of the plurality of traffic processors;

means for determining a load level for the each of the plurality of traffic processors based on a difference between the measured occupancy and the potential occupancy, wherein the means for determining comprises means for applying a weighting factor, the means for applying the weighting factor comprising means for multiplying the difference between the measured occupancy and the potential occupancy of a traffic processor by a value;

means for maintaining the load levels for the plurality of traffic processors; and, means for assigning the call load to the plurality of traffic processors based on the maintained load levels.

6. The system as set forth in claim 5 wherein the means for measuring comprises means for measuring a current actual occupancy of the each of the plurality of traffic processors.

7. The system as set forth in claim 5 wherein the means for estimating uses negotiated bandwidths determined for calls comprising the call load.

8. The system as set forth in claim 5 wherein the means for maintaining comprises a table.

9. A system for balancing call load across a plurality of traffic processors in a wireless network, the system comprising:

a load monitor operative to measure occupancy of each of the plurality of traffic processors, estimate potential occupancy of the each of the plurality of traffic processors and determine a load level for the each of the plurality of traffic processors based on a difference between the measured occupancy and the potential occupancy wherein the load monitor is operative to apply a weighting factor by multiplying the difference between the measured occupancy and the potential occupancy of a traffic processor by a value; and, a load balance manager operative to maintain the load levels for the plurality of traffic processors and assign the call load to the plurality of traffic processors based on the maintained load levels.

10. The system as set forth in claim 9 wherein the load monitor resides on each of the plurality of traffic processors.

11. The system as set forth in claim 9 wherein the load balance manager resides on a control processor.

12. The system as set forth in claim 9 wherein the load monitor is operative to measure a current actual occupancy of the each of the plurality of traffic processors.

13. The system as set forth in claim 9 wherein the load monitor is operative to estimate based on negotiated bandwidths determined for calls comprising the call load.

14. The method as set forth in claim 9 wherein the load balance manager is operative to store load levels in a table.

* * * * *

UNITED STATES PATENT AND TRADEMARK OFFICE
CERTIFICATE OF CORRECTION

PATENT NO. : 7,580,716 B2
APPLICATION NO. : 11/095379
DATED : August 25, 2009
INVENTOR(S) : Ransom et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 947 days.

Signed and Sealed this

Fourteenth Day of September, 2010

David J. Kappos
*Director of the United States Patent and Trademark Office*